United States Patent
Dix (10) Patent No.: US 10,822,031 B2
(45) Date of Patent: Nov. 3, 2020

(54) TURN CONTROL SYSTEM FOR A WORK VEHICLE

(71) Applicant: CNH Industrial America LLC, New Holland, PA (US)

(72) Inventor: Peter John Dix, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 281 days.

(21) Appl. No.: 15/975,076

(22) Filed: May 9, 2018

(65) Prior Publication Data
US 2019/0344827 A1  Nov. 14, 2019

(51) Int. Cl.
*B62D 15/02* (2006.01)
*A01B 69/04* (2006.01)

(52) U.S. Cl.
CPC .......... *B62D 15/029* (2013.01); *A01B 69/008* (2013.01); *B62D 15/025* (2013.01)

(58) Field of Classification Search
CPC .... B62D 15/025; B62D 15/029; A01B 69/008
See application file for complete search history.

(56) References Cited

U.S. PATENT DOCUMENTS

| | | | |
|---|---|---|---|
| 7,363,154 B2* | 4/2008 | Lindores | A01B 69/008 340/995.21 |
| 7,383,114 B1* | 6/2008 | Lange | A01B 69/008 172/132 |
| 7,721,830 B2 | 5/2010 | Dunn et al. | |
| 7,747,370 B2 | 6/2010 | Dix | |
| 8,131,415 B2* | 3/2012 | Peake | G05D 1/0212 701/23 |
| 8,209,075 B2 | 6/2012 | Senneff et al. | |
| 8,565,978 B2 | 10/2013 | Elkins et al. | |
| 8,768,286 B2 | 7/2014 | Naboulsi | |
| 9,002,566 B2* | 4/2015 | McClure | G05D 1/0278 701/28 |
| 9,020,757 B2 | 4/2015 | Peake et al. | |
| 9,271,439 B2 | 3/2016 | Bourgault et al. | |

(Continued)

FOREIGN PATENT DOCUMENTS

EP    3123850    2/2017

OTHER PUBLICATIONS

New Holland Agriculture, "T8000 Series Tractors," 2008, http://www.loweandyoung.com/assets/brochures/t8000seried.pdf, 24 pgs.

(Continued)

*Primary Examiner* — Mussa A Shaawat
(74) *Attorney, Agent, or Firm* — Rickard K. DeMille; Rebecca L. Henkel (57) ABSTRACT

A turn control system for a work vehicle includes a controller having a memory and a processor. The controller is configured to receive a first signal from a turn signal input assembly of the work vehicle indicative of a turn indication. The controller is also configured to output a second signal indicative of activation of a turn signal indication assembly based on the turn indication while in a manual control mode. In addition, the controller is configured to output a third signal to a movement control system indicative of instructions to control a turn direction of the work vehicle at an end of a guidance swath based on the turn indication while in an automatic control mode.

15 Claims, 5 Drawing Sheets

(56) References Cited

U.S. PATENT DOCUMENTS

| | | | |
|---|---|---|---|
| 9,454,155 B2 | 9/2016 | Peake et al. | |
| 9,517,767 B1 | 12/2016 | Kentley et al. | |
| RE47,101 E * | 10/2018 | McClure | |
| 2004/0124605 A1 | 7/2004 | McClure et al. | |
| 2004/0193348 A1* | 9/2004 | Gray | G05D 1/0219 701/50 |
| 2006/0195238 A1* | 8/2006 | Gibson | G05D 1/0061 701/23 |
| 2006/0282205 A1* | 12/2006 | Lange | A01B 69/008 701/50 |
| 2007/0021913 A1* | 1/2007 | Heiniger | A01B 69/008 701/412 |
| 2008/0004778 A1* | 1/2008 | Rekow | A01B 69/004 701/50 |
| 2008/0103690 A1* | 5/2008 | Dix | G05D 1/0278 701/516 |
| 2008/0103694 A1* | 5/2008 | Dix | A01B 69/008 701/425 |
| 2008/0215203 A1* | 9/2008 | Dix | A01B 69/008 701/26 |
| 2008/0249692 A1* | 10/2008 | Dix | G01C 21/00 701/50 |
| 2008/0269956 A1* | 10/2008 | Dix | A01B 69/008 701/1 |
| 2009/0118904 A1* | 5/2009 | Birnie | G01C 21/00 701/41 |
| 2010/0023229 A1* | 1/2010 | Chiocco | A01B 69/003 701/50 |
| 2010/0084147 A1* | 4/2010 | Aral | A01B 69/004 172/1 |
| 2010/0185366 A1* | 7/2010 | Heiniger | A01B 69/008 701/50 |
| 2011/0118926 A1* | 5/2011 | Peake | G05D 1/0227 701/25 |
| 2012/0215410 A1* | 8/2012 | McClure | A01B 79/005 701/50 |
| 2012/0296529 A1* | 11/2012 | Peake | A01B 69/008 701/50 |
| 2012/0312617 A1* | 12/2012 | Makisalo | B60D 1/665 180/204 |
| 2013/0304300 A1* | 11/2013 | Peake | A01B 69/008 701/23 |
| 2014/0324291 A1* | 10/2014 | Jones | E02F 9/2045 701/41 |
| 2016/0023588 A1 | 1/2016 | Peterson | |
| 2016/0159391 A1 | 6/2016 | Fischer et al. | |
| 2016/0302357 A1 | 10/2016 | Tippery et al. | |
| 2016/0355179 A1 | 12/2016 | Cannella et al. | |
| 2016/0355192 A1 | 12/2016 | James et al. | |
| 2017/0112044 A1* | 4/2017 | Stratton | A01B 69/008 |
| 2018/0202804 A1* | 7/2018 | Dumble | G01B 17/00 |
| 2018/0359907 A1* | 12/2018 | Kelley | G05D 1/0223 |
| 2018/0359908 A1* | 12/2018 | Kelley | G05D 1/0219 |

OTHER PUBLICATIONS

TopCon, "X30 Console Operator's Manual Guidance and Auto Steering," Aug. 2012, http://www.tpi.com.ro/uploads/X30_Guidance_and_Autosteering.pdf.

Claas, "Arion," http://www.claas.co.uk/blueprint/servlet/blob/628276/b1af1284048be9583cbf6ba451caa7fd/248702-dataRaw.pdf, retrieved Mar. 30, 2017.

* cited by examiner

TURN CONTROL SYSTEM FOR A WORK VEHICLE

BACKGROUND

The disclosure relates generally to a turn control system for a work vehicle.

Certain work vehicles, such as tractors or other prime movers, may be controlled by a control system (e.g., without operator input, with limited operator input, etc.) during certain phases of operation (e.g., while the control system/work vehicle is in an automatic control mode). For example, a controller of the control system may instruct a steering control system and/or a speed control system of the work vehicle to automatically guide the work vehicle along guidance swaths through a field. The guidance swaths may extend along parallel paths through the field, and the controller may instruct the steering control system and the speed control system to turn the work vehicle at an end of each guidance swath (e.g., within a headland) to move the work vehicle between successive guidance swaths.

The control system may also include a user interface having a display configured to present a visual representation of the guidance swaths and the turns to the operator. In certain configurations, the controller is configured to instruct the display to present a message to the operator indicative of a request to initiate a turn between successive guidance swaths (e.g., at a headland). The operator may authorize the turn via interaction with the user interface (e.g., by depressing a button presented on a touchscreen display, etc.). Unfortunately, the process of locating the button on the display may be time-consuming, thereby interfering with the ability of the operator to perform other tasks while authorizing a turn.

BRIEF DESCRIPTION

In certain embodiments, a turn control system for a work vehicle includes a controller having a memory and a processor. The controller is configured to receive a first signal from a turn signal input assembly of the work vehicle indicative of a turn indication. The controller is also configured to output a second signal indicative of activation of a turn signal indication assembly based on the turn indication while in a manual control mode. In addition, the controller is configured to output a third signal to a movement control system indicative of instructions to control a turn direction of the work vehicle at an end of a guidance swath based on the turn indication while in an automatic control mode.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
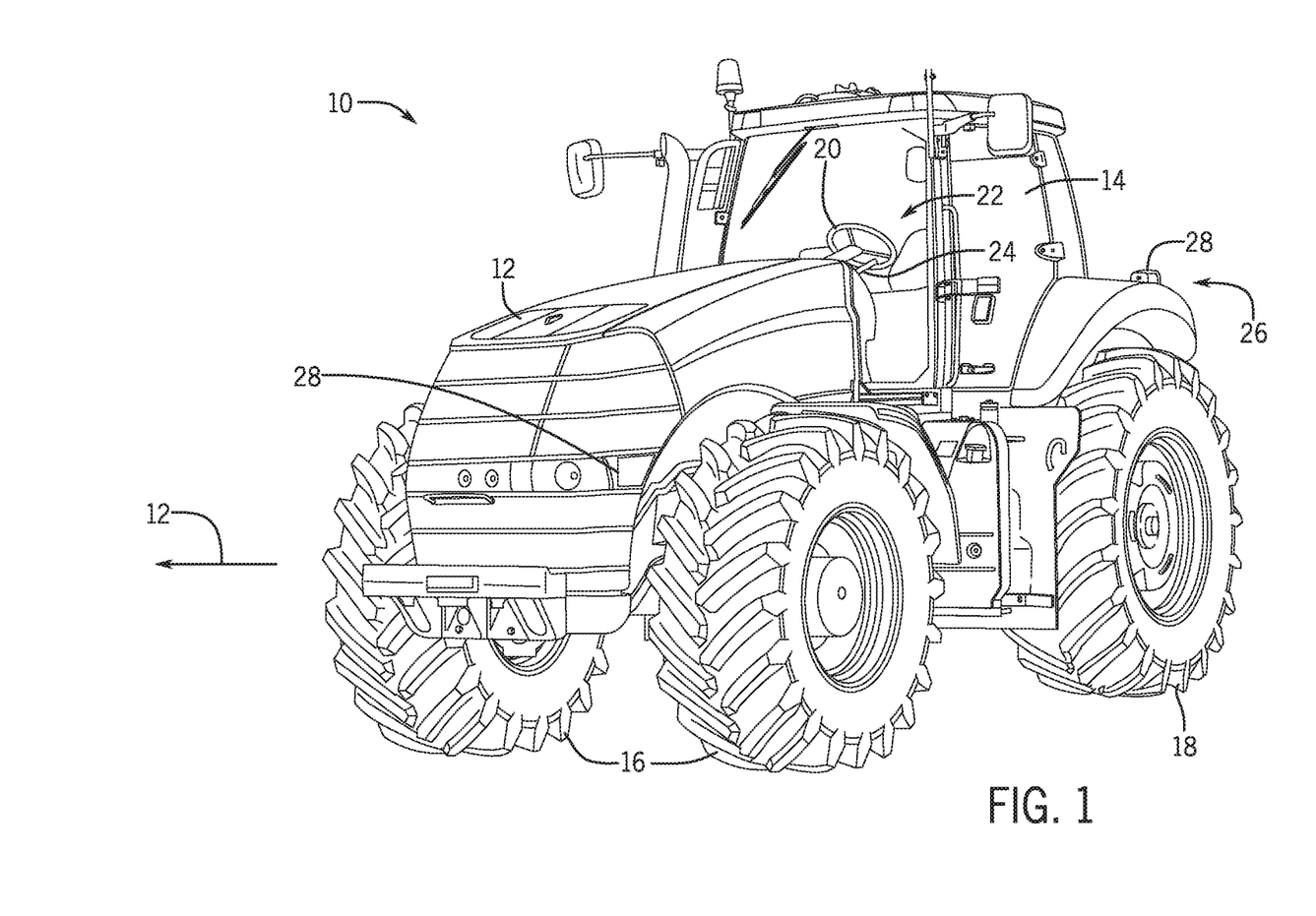
FIG. 1 is a perspective view of an embodiment of a work vehicle that may include a control system.

FIG. 1 is a perspective view of an embodiment of a work vehicle 10 that may include a control system (e.g., turn control system). The control system may be configured to automatically guide the work vehicle 10 through a field (e.g., along a direction of travel 12) to facilitate agricultural operations (e.g., planting operations, seeding operations, application operations, tillage operations, harvesting operations, etc.). For example, the control system may automatically guide the work vehicle 10 along multiple guidance swaths through the field without input from an operator. The control system may also automatically guide the work vehicle 10 around turns (e.g., headland turns) between successive guidance swaths.

In the illustrated embodiment, the work vehicle 10 is a tractor. However, the control system (e.g., turn control system) disclosed herein may be employed within other work vehicles, such as off-road vehicles (e.g., skids steers, construction equipment, etc.), agricultural vehicles (e.g., harvesters, sprayers, etc.), or any other suitable work vehicle types. In the illustrated embodiment, the work vehicle 10 has a body 12 configured to house an engine (e.g., diesel engine), transmission, cooling system, and hydraulic system. Furthermore, the work vehicle 10 has a cab 14 where an operator may sit or stand to operate the work vehicle 10. The work vehicle 10 also has two front wheels 16 and two rear wheels 18 that rotate to move the work vehicle 10 through a field. The front wheels 16 and/or the rear wheels 18 may be driven to rotate by the engine and/or the hydraulic system (e.g., hydraulic motor(s) of the hydraulic system). While the illustrated work vehicle 10 includes wheels, in other embodiments, the work vehicle may include tracks or a combination of wheels and tracks.

In the illustrated embodiment, the work vehicle 10 includes a steering wheel 20 within the cab 14. The steering wheel 20 is configured to control rotation of the front wheels 16 and/or the rear wheel 18, thereby controlling the direction of travel 12 of the work vehicle 10. In addition, the work vehicle 10 includes a turn signal input assembly 22, and the turn signal input assembly 22 includes an input device 24. In the illustrated embodiment, the input device 24 is a turn signal stalk extending from a steering column proximate to the steering wheel 20. The turn signal input assembly 22 is configured to output a signal (e.g., first signal) indicative of a turn indication based on a state of the input device 24 (e.g., turn signal stalk). For example, if an operator rotates the turn signal stalk in a first direction, the turn signal input assembly may output a signal indicative of a left turn indication, and if the operator rotates the turn signal stalk in a second direction, opposite the first direction, the turn signal input assembly may output a signal indicative of a right turn indication.

In certain embodiments, the work vehicle 10 includes a control system having the turn signal input assembly and a controller communicatively coupled to the turn signal input assembly. The control system also includes a turn signal indication assembly 26 communicatively coupled to the controller. In the illustrated embodiment, the turn signal indication assembly 26 includes two left turn signals 28 and two right turn signals. However, in alternative embodiments, the turn signal indication assembly may include more or fewer turns signals (e.g., 1, 2, 3, 4, 5, 6, or more left turn signals, and a corresponding number of right turn signals). Furthermore, while the turn signal indication assembly 26 includes turn signals at the front of the work vehicle 10 and at the rear of the work vehicle 10 in the illustrated embodiment, in other embodiments, the turn signals may be positioned at other and/or additional suitable locations on the work vehicle 10. The controller is configured to output a signal (e.g., second signal) indicative of activation of the turn signal indication assembly 26 based on the turn indication while the controller/control system/work vehicle is operating in a manual control mode. For example, if the operator rotates the turn signal stalk in the first direction, the turn signal input assembly may output a first signal indicative of a left turn indication. The controller may receive the first signal and output a second signal indicative of activation of the left turn signals 28 of the turn signal indication assembly 26, thereby causing the left turn signals 28 to illuminate in a flashing pattern.

In certain embodiments, the input device 24 of the turn signal input assembly 22 may be used to control a turn direction of the work vehicle 10 at an end of a guidance swath while the controller/control system/work vehicle is operating in an automatic control mode. In such embodiments, the controller may be configured to output a signal (e.g., third signal) to a movement control system indicative of instructions to control a turn direction of the work vehicle at an end of a guidance swath based on the turn indication. For example, as the work vehicle approaches an end of a guidance swath, the controller may instruct a user interface to inform the operator of a direction of a planned turn. The operator may authorize the planned turn by actuating the input device 24 of the turn signal input assembly 22 in a manner corresponding to indicating a turn in the direction of the planned turn (e.g., rotating the turn signal stalk in a direction corresponding to the direction of the planned turn). In response to receiving a signal (e.g., first signal) from the turn signal input assembly indicative of the turn indication, the controller may instruct the movement control system to initiate the turn at the end of the guidance swath. However, if a turn in the opposite direction is desired (e.g., due to an obstacle in the path of the work vehicle along the planned turn), the operator may actuate the input device 24 of the turn signal assembly 22 in a manner corresponding to indicating a turn in the opposite direction of the planned turn (e.g., rotating the turn signal stalk in a direction corresponding to the opposite direction of the planned turn). In response to receiving a signal (e.g., first signal) from the turn signal input assembly indicative of the turn indication, the controller may instruct the movement control system to initiate a turn in an opposite direction of the planned turn at the end of the guidance swath. Because the input device (e.g., turn signal stalk) of the turn signal input assembly may be readily accessible by the operator, using the input device to control the direction of the turn may significantly reduce the duration associated with providing operator feedback (e.g., as compared to an operator locating and depressing a button on a touchscreen display to control the turn direction), thereby enabling the operator to focus on other tasks.

In certain embodiments, the controller is configured to output a signal (e.g., fourth signal) indicative of activation of the turn signal indication assembly 26 based on the turn direction while the controller/control system/work vehicle is operating in the automatic control mode. For example, the controller may be configured to output the signal indicative of activation of the turn signal indication assembly 26 before initiation of the turn at the end of the guidance swath, and the controller may be configured to terminate the signal in response to completion of the turn. As a result, the turn signals of the turn signal indication assembly 26 may indicate the direction of the turn, thereby informing individuals proximate to the work vehicle 10 of the turn direction. In addition, as discussed in detail below, the turn signal indication assembly may include turn indicators within the interior of the cab 14. Accordingly, activation of the turn signal indication assembly may cause a turn indicator associated with the direction of the turn to illuminate in a flashing pattern, thereby providing the operator with an indication of the turn direction.

Figure 2:
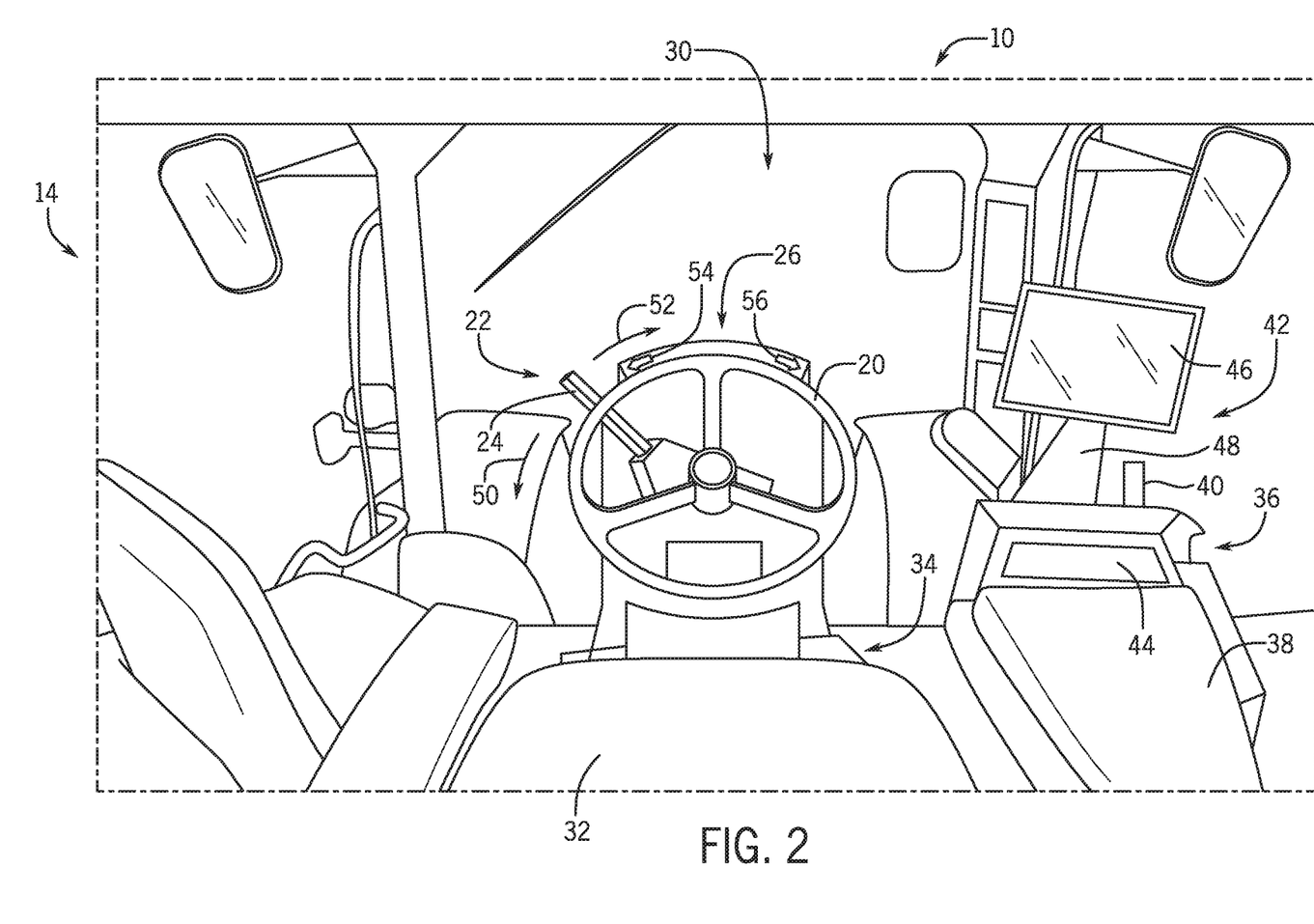
FIG. 2 is a perspective view of an embodiment of an interior of the work vehicle of FIG. 1.

FIG. 2 is a perspective view of an embodiment of an interior 30 of the cab 14 of the work vehicle 10 of FIG. 1 (e.g., from the operator's point of view). As illustrated, the cab 14 includes a seat 32, on which the operator may sit while operating the work vehicle 10. In the illustrated embodiment, the steering wheel 20 is located near the seat 32, so as to be within reach of the operator while the operator is seated on the seat 32. Though a steering wheel 20 is included in the illustrated embodiment, other embodiments of the work vehicle may include other and/or additional suitable devices for receiving steering inputs from the operator. For example, in certain embodiments, the work vehicle may include left/right control bars, a hand controller, pedals, another suitable device for receiving steering inputs, or a combination thereof. In the illustrated embodiment, the work vehicle 10 includes pedals 34 configured to be actuated by feet of the operator. The pedals 34 may be configured to receive input from the operator for controlling the speed of the work vehicle 10. For example, the pedals may control a throttle, brakes, a clutch, other suitable systems, or a combination thereof. In other embodiments, the pedals may be used for steering inputs. Further, in certain embodiments, the pedals may be omitted (e.g., in embodiments in which the speed control inputs are provided via a hand controller, etc.).

In the illustrated embodiment, an armrest assembly 36 is positioned along a lateral side of the seat 32. The armrest assembly 36 includes an armrest 38, a hand controller 40, and a user interface 42. The user interface 42 includes an input assembly 44 (e.g., including one or more buttons, one or more switches, one or more knobs, etc.), a display 46

(e.g., touchscreen display), and a support 48 configured to position the display 46 above the armrest 38. The display 46 may be used to present information to the operator, such as vehicle information (e.g., ground speed, oil pressure, engine temperature, etc.), implement operations information (e.g., tool penetration depth, agricultural product flow rate, etc.), and plan information (e.g., visual representations of guidance swaths, visual representations of turns, etc.). The hand controller 40 and the input assembly 44 may enable the operator to control the work vehicle 10 by inputting commands or instructions, which may be presented on the display 46. In certain embodiments, the display may be a touchscreen display configured to enable the operator to input information by depressing buttons or other objects on the display. By navigating menus/controls on the display 46, the operator may control various features of the work vehicle 10 and/or an implement coupled to or towed by the work vehicle 10.

As illustrated, the input device 24 (e.g., turn signal stalk) of the turn signal input assembly 22 is positioned proximate to the steering wheel 20 (e.g., extending from a steering column). As previously discussed, the turn signal input assembly 22 is configured to output a signal (e.g., first signal) indicative of a turn indication based on a state of the input device 24 (e.g., turn signal stalk). For example, if the operator rotates the turn signal stalk in a first direction 50, the turn signal input assembly may output a signal (e.g., first signal) indicative of a left turn indication, and if the operator rotates the turn signal stalk in a second direction 52, opposite the first direction, the turn signal input assembly may output a signal (e.g., first signal) indicative of a right turn indication.

In the illustrated embodiment, the turn signal indication assembly 26 includes a left turn indicator 54 and a right turn indicator 56 within the interior 30 of the cab 14. As illustrated, the turn indicators are positioned above and proximate to the steering wheel 20. However, in alternative embodiments, the turn indicators may be positioned at any suitable location within the cab interior. In certain embodiments, the turn signal input assembly 22 and the turn signal indication assembly 26 are elements of a control system and communicatively coupled to a controller of the control system. The controller is configured to output a signal (e.g., second signal) indicative of activation of the turn signal indication assembly 26 based on the turn indication (e.g., from the turn signal input assembly) while the controller/control system/work vehicle is operating in a manual control mode. For example, if the operator rotates the turn signal stalk in the first direction 50, the turn signal input assembly 22 may output a first signal indicative of a left turn indication. The controller may receive the first signal and output a second signal indicative of activation of the left turn signal(s) and the left turn indicator 54 of the turn signal indication assembly 26, thereby causing the left turn signal(s) and the left turn indicator 54 to illuminate in a flashing pattern. In addition, if the operator rotates the turn signal stalk in the second direction 52, the turns signal input assembly 22 may output a first signal indicative of a right turn indication. The controller may receive the first signal and output a second signal indicative of activation of the right turn signal(s) and the right turn indicator 56 of the turn signal indication assembly 26, thereby causing the right turn signal(s) and the right turn indicator 56 to illuminate in a flashing pattern.

In addition, the input device 24 of the turn signal input assembly 22 may be used to control a turn direction of the work vehicle 10 at an end of a guidance swath while the controller/control system/work vehicle is operating in an automatic control mode. For example, the controller may be configured to output a signal (e.g., third signal) to a movement control system indicative of instructions to control a turn direction of the work vehicle at an end of a guidance swath based on the turn indication. Furthermore, as the work vehicle approaches an end of a guidance swath, the controller may output a signal (e.g., sixth signal) indicative of selective activation of the left turn signal(s) and the right turn signal(s) of the turn signal indication assembly 26 based on a planned turn of a plan. In certain embodiments, the plan includes the guidance swaths and the planned turns between guidance swaths. Activation of the left turn signal(s) or the right turn signal(s) informs individuals outside of the work vehicle 10 of the direction of the planned turn. In certain embodiments, the signal (e.g., sixth signal) indicative of selective activation of the left/right turn signal(s) may also cause the corresponding left turn indicator 54/right turn indicator 56 to illuminate in a flashing pattern (e.g., corresponding to the flashing pattern of the corresponding turn signal(s)), thereby informing the operator of the direction of the planned turn. For example, if the plan includes a planned turn to the left at the end of the guidance swath, the controller may output a signal (e.g., sixth signal) indicative of activation of the left turn signal(s) in advance of the turn. The left turn signal(s) and the left turn indicator 54 may illuminate in a flashing pattern to indicate a left turn is planned. Due to the location of the turn indicators and the flashing pattern emitting by the turn indicators, the turn indicators may provide a more visible indication of the direction of the plan turned than an indicator (e.g., arrow, etc.) presented on the display. As a result, the operator may identify the direction of the planned turn more readily. However, in certain embodiments, the direction of the planned turn may be indicated by the turn indicators and an indictor presented on the display.

In certain embodiments, the controller may only initiate the planned turn in response to receiving authorization from the operator. Otherwise, the controller may output a signal (e.g., a fifth signal) to the movement control system indicative of instructions to stop the work vehicle. The operator may authorize the planned turn by actuating the input device 24 of the turn signal input assembly 22 in a manner corresponding to indicating a turn in the direction of the planned turn (e.g., rotating the turn signal stalk in a direction corresponding to the direction of the planned turn). In response to receiving a signal (e.g., first signal) from the turn signal input assembly 22 indicative of the turn indication in the direction of the planned turn, the controller may instruct the movement control system to initiate the planned turn at the end of the guidance swath. However, if a turn in the opposite direction is desired (e.g., due to an obstacle in the path of the work vehicle along the planned turn), the operator may actuate the input device 24 of the turn signal assembly 22 in a manner corresponding to indicating a turn in the opposite direction of the planned turn (e.g., rotating the turn signal stalk in a direction corresponding to the opposite direction of the planned turn). In response to receiving a signal (e.g., first signal) from the turn signal input assembly indicative of the turn indication in the opposite direction of the planned turn, the controller may instruct the movement control system to initiate a turn in the opposite direction of the planned turn at the end of the guidance swath. The controller may also output a signal indicative of activation of the corresponding turn signal(s) and/or turn indicator to inform the individuals positioned outside the work vehicle and/or the operator of the direction of the turn. In certain embodiments, the controller is also configured to adjust the plan in response to receiving a signal indicative of the turn indication in the opposite direction of the planned turn, thereby enabling the work vehicle to complete an originally planned task (e.g., tilling a portion of a field). Once the turn is complete (e.g., in the direction of the planned turn or in the opposite direction of the planned turn), the controller may terminate the signal indicative of activation of the turn signal(s) and/or the turn indicator.

Because the input device (e.g., turn signal stalk) may be readily accessible by the operator, using the input device to control the direction of the turn may significantly reduce the duration associated with providing operator feedback (e.g., as compared to an operator locating and depressing a button on a display to control the turn), thereby enabling the operator to focus on other tasks while the controller/control system/work vehicle is operating in the automatic control mode. The turn signal stalk may be moved from a center position to an actuated position by rotating the turn signal stalk in the first direction 50 or the second direction 52. In certain embodiments, the turn signal stalk may remain in the actuated position until mechanically released (e.g., via rotation of the steering wheel in an opposite direction of the turn indication). In addition, the turn signal stalk may be manually rotated to the center position to cancel/disengage activation of the turn signal(s) and/or turn indicator. In other embodiments, the turn signal stalk may automatically return to the center position after being rotated to an actuated positioned and then released (e.g., via a spring within the turn signal input assembly). In such embodiments, while operating in the manual control mode, the controller, in response to receiving a signal indicative of a turn indication, may cause the turn signal(s) and/or the turn indicator to illuminate in a flashing pattern until a cancelation signal is received from an input device (e.g., button, etc.) or from a steering wheel sensor (e.g., indicating rotation of the steering wheel in a direction opposite the turn indication). In certain embodiments, the cancelation signal may also be output by the turn signal input assembly in response to rotation of the turn signal stalk in a direction opposite the turn indication. In such embodiments, the turn signal input assembly may output a signal indicative of a second turn indication, in the opposite direction of the first turn indication, in response to rotating the turn signal stalk in the direction corresponding to the second turn indication twice (e.g., once to output the cancelation signal, and a second time to output the signal indicative of the second turn indication).

While the illustrated input device of the turn signal input assembly is a turn signal stalk, in other embodiments, the input device may be a temporary switch (e.g., of the input assembly 44), a rotary knob, one or more buttons (e.g., on the steering wheel 20), or any other suitable type of input device. For example, in certain embodiments, the input device may include a left turn button (e.g., positioned on a left side of the steering wheel), a right turn button (e.g., positioned on the right side of the steering wheel), and a cancelation button. Depressing the left turn button or the right turn button may cause the turn signal input assembly to output a signal (e.g., first signal) to the controller indicative of a turn indication, and depressing the cancelation button may cause the turn signal input assembly to terminate the signal and/or output a cancelation signal.

Figure 3:
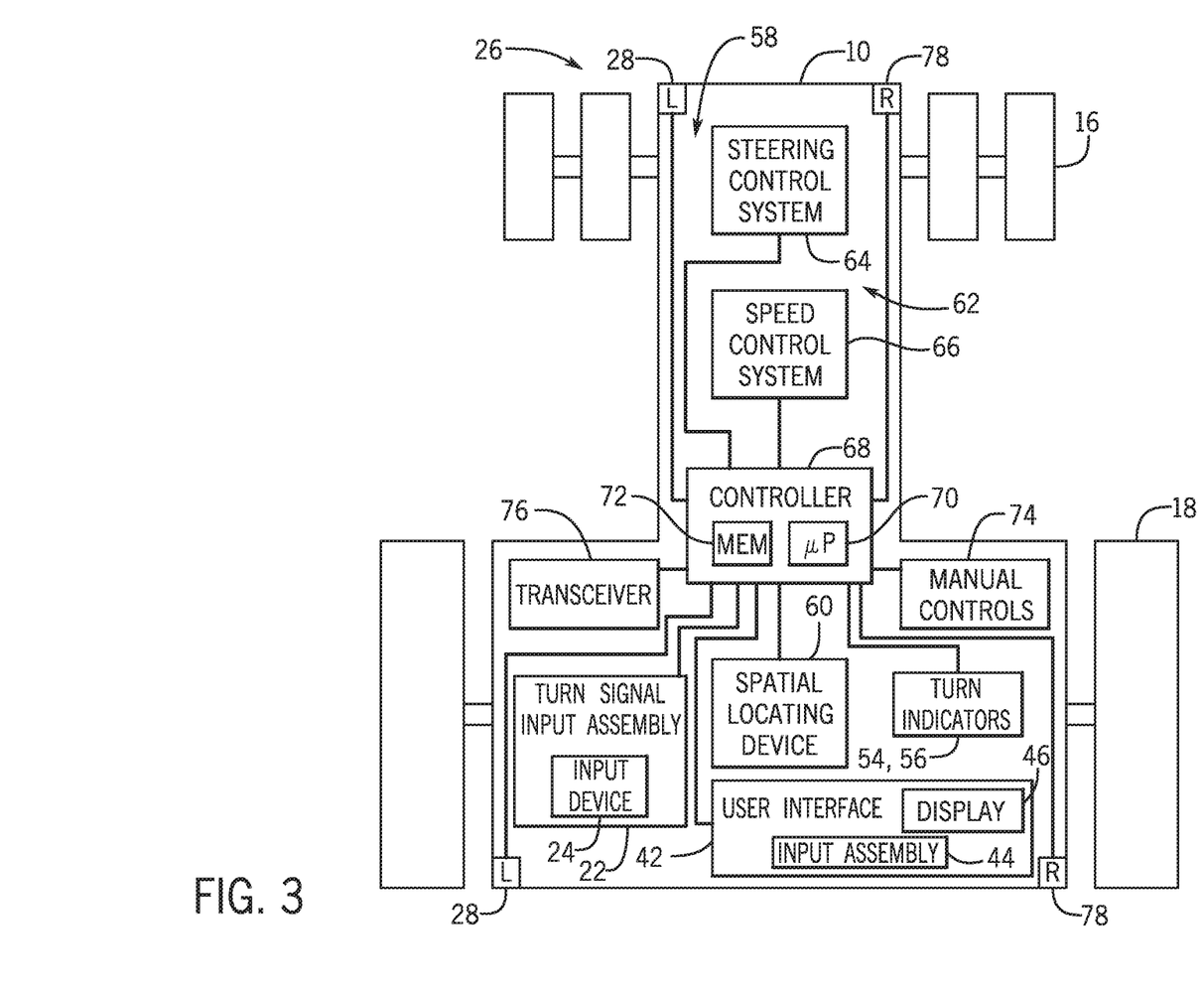
FIG. 3 is a block diagram of an embodiment of a control system that may be employed within the work vehicle of FIG. 1.

FIG. 3 is a block diagram of an embodiment of a control system 58 (e.g., turn control system) that may be employed within the work vehicle 10 of FIG. 1. In the illustrated embodiment, the control system 58 includes a spatial locating device 60, which is mounted to the work vehicle 10 and configured to determine a position and, in certain embodiments, a velocity of the work vehicle 10. The spatial locating device 60 may include any suitable system configured to measure and/or determine the position of the work vehicle 10, such as a GPS receiver, for example.

In the illustrated embodiment, the control system 58 includes a movement control system 62 having a steering control system 64 configured to control a direction of movement of the work vehicle 10 and a speed control system 66 configured to control a speed of the work vehicle 10. In addition, the control system 58 includes a controller 68, which is communicatively coupled to the spatial locating device 60, to the steering control system 64, to the speed control system 66, to the turn signal input assembly 22, and to the turn signal indication assembly 26. The controller 68 is configured to automatically control the work vehicle (e.g., without operator input, with limited operator input, etc.) while the controller/control system/work vehicle is in an automatic control mode.

In certain embodiments, the controller 68 is an electronic controller having electrical circuitry configured to process data from the spatial locating device 60, the turn signal input assembly 22, other components of the control system 58, or a combination thereof. In the illustrated embodiment, the controller 68 includes a processor, such as the illustrated microprocessor 70, and a memory device 72. The controller 68 may also include one or more storage devices and/or other suitable components. The processor 70 may be used to execute software, such as software for controlling the work vehicle, software for controlling the turn signal indication assembly 26, and so forth. Moreover, the processor 70 may include multiple microprocessors, one or more "general-purpose" microprocessors, one or more special-purpose microprocessors, and/or one or more application specific integrated circuits (ASICS), or some combination thereof. For example, the processor 70 may include one or more reduced instruction set (RISC) processors.

The memory device 72 may include a volatile memory, such as random access memory (RAM), and/or a nonvolatile memory, such as read-only memory (ROM). The memory device 72 may store a variety of information and may be used for various purposes. For example, the memory device 72 may store processor-executable instructions (e.g., firmware or software) for the processor 70 to execute, such as instructions for controlling the work vehicle, instructions for controlling the turn signal indication assembly 26, and so forth. The storage device(s) (e.g., nonvolatile storage) may include ROM, flash memory, a hard drive, or any other suitable optical, magnetic, or solid-state storage medium, or a combination thereof. The storage device(s) may store data (e.g., position data, vehicle geometry data, etc.), instructions (e.g., software or firmware for controlling the work vehicle, etc.), and any other suitable data.

In certain embodiments, the steering control system 64 may include a wheel angle control system, a differential braking system, a differential wheel speed system, or a combination thereof. The wheel angle control system may automatically rotate one or more wheels and/or tracks of the work vehicle (e.g., via hydraulic actuators) to steer the work vehicle along a target route (e.g., along guidance swaths, along turns between guidance swaths, etc.). By way of example, the wheel angle control system may rotate front wheels/tracks, rear wheels/tracks, intermediate wheels/tracks, or a combination thereof, of the work vehicle (e.g., either individually or in groups). In certain embodiments, the work vehicle includes a front portion having front wheel/tracks and a rear portion having rear wheels/tracks, in which the front and rear portions of the work vehicle are coupled to one another by a pivot joint, thereby forming an articulated work vehicle. In such embodiments, the wheel angle control system may rotate the rear portion of the work vehicle relative to the front portion to steer the work vehicle along the target route. The differential braking system may independently vary the braking force on each lateral side of the work vehicle to direct the work vehicle along a path. In addition, the differential wheel speed system may independently control the speed of wheel(s) and/or track(s) on each lateral side of the work vehicle, thereby directing the work vehicle along a path. For example, if the work vehicle includes one track on each lateral side of the work vehicle, the differential wheel speed system may control the direction of the work vehicle by adjusting the speed of each track. In addition, if the work vehicle includes at least one driven wheel on each lateral side of the work vehicle (e.g., a front driven wheel and a rear non-driven wheel, such as a caster wheel), the differential wheel speed system may control the direction of the work vehicle by adjusting the speed of each driven wheel. In further embodiments, the steering control system may include other and/or additional systems to facilitate directing the work vehicle along a path through the field.

In certain embodiments, the speed control system 66 may include an engine output control system, a transmission control system, a braking control system, or a combination thereof. The engine output control system may vary the output of the engine to control the speed of the work vehicle. For example, the engine output control system may vary a throttle setting of the engine, a fuel/air mixture of the engine, a timing of the engine, other suitable engine parameters to control engine output, or a combination thereof. In addition, the transmission control system may adjust a gear ratio of a transmission (e.g., by adjusting gear selection in a transmission with discrete gears, by controlling a continuously variable transmission (CVT), etc.) to control the speed of the work vehicle. Furthermore, the braking control system may adjust braking force, thereby controlling the speed of the work vehicle. In further embodiments, the speed control system may include other and/or additional systems to facilitate adjusting the speed of the work vehicle.

In certain embodiments, the control system may also control operation of an agricultural implement coupled to the work vehicle. For example, the control system may include an implement control system/implement controller configured to control a steering angle of the implement (e.g., via an implement steering control system having a wheel angle control system and/or a differential braking system) and/or a speed of the work vehicle/implement system (e.g., via an implement speed control system having a braking control system). In such embodiments, the work vehicle control system may be communicatively coupled to a control system/controller on the implement via a communication network, such as a controller area network (CAN bus).

In the illustrated embodiment, the control system 58 includes the user interface 42, which is communicatively coupled to the controller 68. The user interface 42 is configured to enable an operator to control certain parameter(s) associated with operation of the work vehicle. In the illustrated embodiment, the user interface 42 includes the input assembly 44 and the display 46. The display 46 is configured to present information to the operator, such as a graphical representation of the guidance swaths, a graphical representation of turns, a visual representation of certain parameter(s) associated with operation of the work vehicle (e.g., fuel level, oil pressure, water temperature, etc.), a visual representation of certain parameter(s) associated with operation of an agricultural implement coupled to the work vehicle (e.g., seed level, penetration depth of ground engaging tools, orientation(s)/position(s) of certain components of the implement, etc.), or a combination thereof, among other information. In certain embodiments, the display 46 may include a touchscreen interface that enables the operator to control certain parameters associated with operation of the work vehicle and/or the agricultural implement.

In the illustrated embodiment, the control system 58 includes manual controls 74 configured to enable an operator to control the work vehicle while the controller/control system/work vehicle is in a manual control mode. The manual controls 74 may include manual steering control (e.g., the steering wheel), manual transmission control, manual braking control, or a combination thereof, among other controls. In the illustrated embodiment, the manual controls 74 are communicatively coupled to the controller 68. The controller 68 is configured to disengage automatic control of the work vehicle (e.g., terminate the automatic control mode) upon receiving a signal indicative of manual control of the work vehicle. Accordingly, if an operator controls the work vehicle manually, the controller/control system/work vehicle transitions to the manual control mode.

In the illustrated embodiment, the control system 58 includes a transceiver 76 communicatively coupled to the controller 68. The transceiver 76 is configured to establish a communication link with a corresponding transceiver of a base station and/or another work vehicle, thereby facilitating communication between the base station/other work vehicle and the control system 58 of the work vehicle 10. The transceiver 76 may operate at any suitable frequency range within the electromagnetic spectrum. For example, in certain embodiments, the transceiver 76 may broadcast and receive radio waves within a frequency range of about 400 MHz to about 6 GHz. In addition, the transceiver 76 may utilize any suitable communication protocol, such as a standard protocol (e.g., Wi-Fi, Bluetooth, etc.) or a proprietary protocol.

In certain embodiments, the control system may include other and/or additional controllers/control systems, such as the implement controller/control system discussed above. For example, the implement controller/control system may be configured to control various parameters of an agricultural implement towed by the work vehicle. In certain embodiments, the implement controller/control system may be configured to instruct actuator(s) to adjust a penetration depth of at least one ground engaging tool of the agricultural implement. By way of example, the implement controller/control system may instruct actuator(s) to reduce or increase the penetration depth of each tillage point on a tilling implement, or the implement controller/control system may instruct actuator(s) to engage or disengage each opener disc/blade of a seeding/planting implement from the soil. Furthermore, the implement controller/control system may instruct actuator(s) to transition the agricultural implement between a working position and a transport portion, to adjust a flow rate of product from the agricultural implement, or to adjust a position of a header of the agricultural implement (e.g., a harvester, etc.), among other operations. For example, with regard to application implements (e.g., sprayers, floaters, etc.), seeding implements, and planting implements, the implement controller/control system may control the product flow rate from multiple nozzles/row units (e.g., individually or in groups) based on the location of the implement or the locations of the nozzles/row units and a prescription map (e.g., which may be part of the plan). The work vehicle control system may also include controller(s)/ control system(s) for electrohydraulic remote(s), power take-off shaft(s), adjustable hitch(es), or a combination thereof, among other controllers/control systems.

In the illustrated embodiment, the controller 68 is configured to receive a first signal from the turn signal input assembly 22 indicative of a turn indication. While the controller 68 (e.g., processor 70 of the controller 68)/control system 58/work vehicle 10 is operating in the manual control mode, the controller 68 is configured to output a second signal indicative of activation of the turn signal indication assembly 26 based on the turn indication. For example, if the turn signal input assembly 22 outputs the first signal indicative of a left turn (e.g., based on a state of the input device 24), the controller 68 may output a second signal indicative of activation of the left turn signal(s) 28 and/or the left turn indicator 54 of the turn signal indication assembly 26. In addition, if the turn signal input assembly 22 outputs the first signal indicative of a right turn (e.g., based on a state of the input device 24), the controller 68 may output a second signal indicative of activation of the right turn signal(s) 78 and/or the right turn indicator 56.

In addition, while the controller 68 (e.g., processor 70 of the controller 68)/control system 58/work vehicle 10 is operating in the automatic control mode, the controller 68 may output a sixth signal indicative of selective activation of the left turn signal(s) 28/left turn indicator 54 and the right turn signal(s) 78/right turn indicator 56 based on a planned turn of a plan. Accordingly, the operator and/or an individual positioned outside the work vehicle may receive a visual indication of the direction of the planned turn. The operator may then determine whether a turn in the direction of the planned turn is desired. In certain embodiments, the direction of the planned turn and/or a countdown timer may be presented on the display 46 of the user interface 42. The countdown timer may indicate the time (e.g., number of seconds) before initiation of the planned turn. In certain embodiments, the controller 68 may automatically instruct the movement control system 62 to initiate the turn in the direction of the planned turn at the end of the guidance swath if no input is received from the operator via the turn signal input assembly 22 (e.g., by the time the countdown timer reaches zero). In other embodiments, the controller 68 is configured to output a fifth signal to the movement control system 62 indicative of instructions to stop the work vehicle 10 unless the turn signal indication is received before the work vehicle reaches the end of the guidance swath. For example, if a left turn is planned, the controller 68 may instruct the movement control system 62 to initiate the left turn if a left turn indication is received from the turn signal input assembly 22. However, if no turn indication is received, the controller 68 may instruct the movement control system 62 to stop the work vehicle (e.g., when the countdown timer reaches zero).

In certain embodiments, the controller may instruct the user interface to output a visual indication (e.g., on the display) and/or an audible indication that the time to authorize the turn is expiring. For example, the controller may instruct the user interface to output the indication when the countdown timer reaches 5 seconds, 4 seconds, 3 seconds, or any other suitable time. Furthermore, in certain embodiments, the controller may instruct the user interface to output a visual indication (e.g., on the display) and/or an audible indication indicative of operator input to the turn signal input assembly. For example, if the operator actuates the input device of the turn signal input assembly to indicate a left turn (e.g., rotates the turn signal stalk in the first direction) the controller may instruct the display to present a confirmation of the input (e.g., in the form of an arrow pointing in the direction of the turn direction).

Furthermore, if the controller 68 receives a first signal indicative of a turn indication in the opposite direction of the planned turn before the end of the guidance swath (e.g., before the countdown timer reaches zero), the controller may adjust the plan accordingly. For example, if a left turn is planned at the end of the guidance swath, and the operator controls the input device 24 to indicate a right turn (e.g., rotates the turn signal stalk to the right), the controller 68 may adjust the plan to include a right turn at the end of the guidance swath. The controller 68 may then instruct the movement control system 62 (e.g., via the third signal) to direct the work vehicle 10 along a path associated with a right turn at the end of the guidance swath. In addition, the controller 68 may adjust the plan (e.g., the order of the guidance swaths, the direction of the turns, etc.) such that the originally planned task (e.g., tilling a portion of the field) may be completed. The operator may elect to direct the work vehicle in the direction opposite the planned turn direction due to an obstruction (e.g., vehicle, tree, etc.) within the path of the planned turn.

While the controller 68/control system 58/work vehicle 10 is in the automatic control mode, the controller 68 may output a fourth signal indicative of activation of the turn signal indication assembly 26 based on the turn direction. For example, before a left turn is initiated, the controller 68 may output the fourth signal to cause the left turn signal(s) 28 and/or the left turn indicator 54 of the turn signal indication assembly 26 to illuminate in a flashing pattern. In addition, the controller 28 may terminate the fourth signal in response to completion of the turn. In certain embodiments, the turn is completed when the steering control system 64 directs the work vehicle 10 along a substantially straight line (e.g., associated with a subsequent guidance swath). Furthermore, in certain embodiments, the rate at which the turn signals and/or turn indicators flash to indicate a direction of turn while the controller/control system/work vehicle is operating in the automatic control mode is the same as the rate at which the turn signals and/or turn indicators flash to indicate a direction of turn while the controller/control system/work vehicle is operating in the manual control mode (e.g., turn signals/indicators controlled by the direction of rotation of the turn signal stalk). However, in further embodiments, the automatic control rate may be different than the manual control rate. Furthermore, in the illustrated embodiment, the same turn signals and turn indicators are utilized to indicate the direction of turn while the controller/control system/work vehicle is operating in the automatic control mode and while the controller/control system/work vehicle is operating in the manual control mode. However, in other embodiments, independent turn signals and/or turn indicators may be utilized to indicate the turn direction for manual control mode operation and for automatic control mode operation (e.g., to indicate whether the controller/control system/work vehicle is operating in the manual control mode or the automatic control mode).

As previously discussed, the controller 68 is configured to receive the first signal from the turn signal input assembly 22 indicative of a turn indication, to output the second signal indicative of activation of the turn signal indication assembly 26 based on the turn indication while in a manual control mode, and to output the third signal to the movement control system 62 indicative of instructions to control a turn direction of the work vehicle 10 at the end of a guidance swath based on the turn indication while in an automatic control mode. In certain embodiments, the controller may include a first section configured to output the second signal, and a second section configured to output the third signal. For example, the turn signal input assembly may include two separate sensors configured to determine the state of the input device (e.g., the position of the turn signal stalk). The two sensors may collectively output the first signal to the controller. For example, the first sensor may output a signal to the first section of the controller, and the second sensor may output the second signal to the second section of the controller. The first section of the controller (e.g., a turn signal flasher module) may output the second signal indicative of activation of the turn signal indication assembly based on the turn indication (e.g., from the first sensor) while the controller is in the manual control mode, and the second section of the controller (e.g., including the processor and the memory) may output the third signal to the movement control system based on the turn indication (e.g., from the second sensor) while the controller is in the automatic control mode. However, in other embodiments, the controller may include a signal section (e.g., including the processor and the memory), and/or the turn signal input assembly may include a single input device state sensor.

Figure 4:
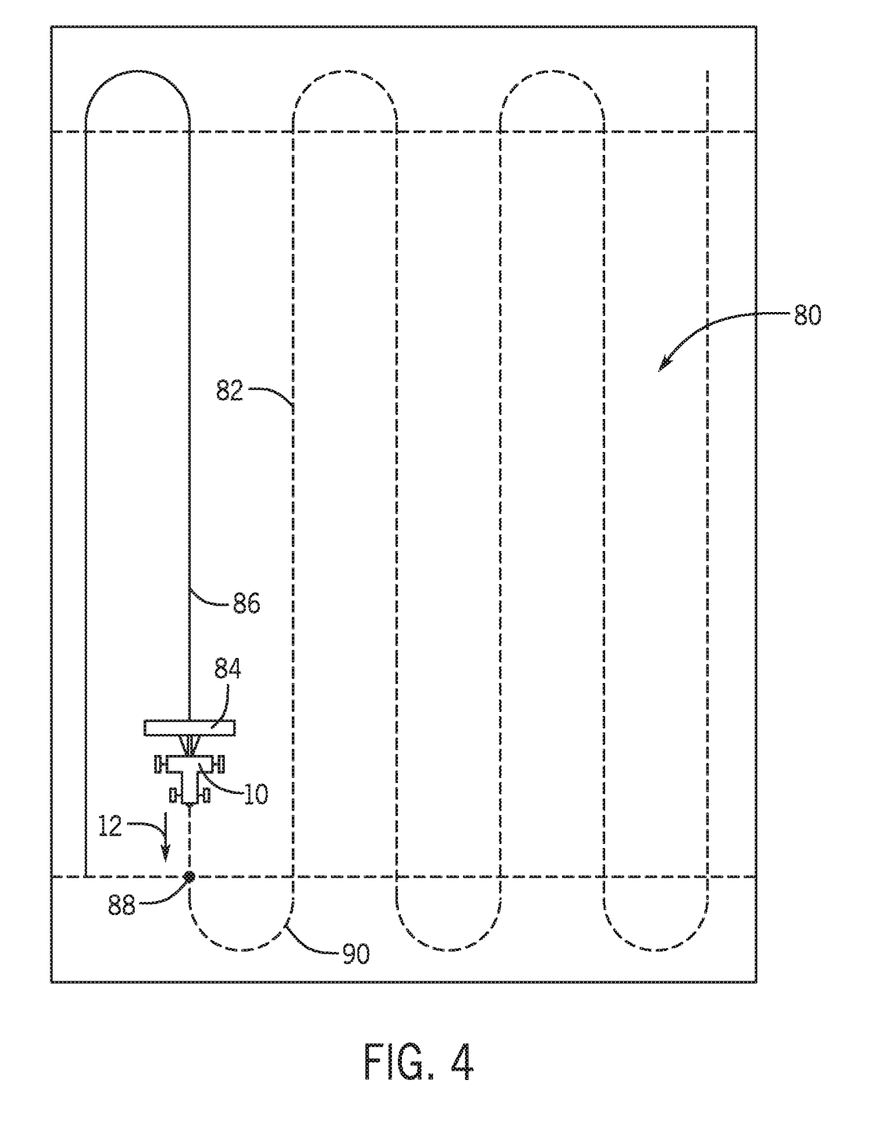
FIG. 4 is a schematic diagram of an embodiment of the work vehicle within a field, in which the work vehicle is approaching a planned turn.

FIG. 4 is a schematic diagram of an embodiment of the work vehicle 10 within a field 80, in which the work vehicle 10 is approaching a planned turn. As illustrated, the work vehicle 10 is following a route 82 through the field 80. The solid lines represent a portion of the route 82 that has been traversed by the work vehicle 10, and the dashed lines represent a portion of the route 82 that has been planned but not traversed. The route 82 is an element of a plan that may also include routes for other work vehicles within the field. As illustrated, the work vehicle 10 is towing an implement 84 along the route 82 in the direction of travel 12, thereby enabling the implement 84 to perform an agricultural operation within the field (e.g., a tilling operation, a seeding operation, a harvesting operation, etc.).

As illustrated, the work vehicle 10 is operating in the automatic control mode and traveling along a guidance swath 86. As the work vehicle 10 approaches an end point 88 of the guidance swath 86, the controller may output a signal indicative of activation of the left turn signal(s) 28/left turn indicator 54 to provide a visual indication of the direction of the planned turn to the operator and/or individuals positioned outside of the work vehicle. The operator may determine whether a left turn is desired. In certain embodiments, the controller may automatically instruct the movement control system to initiate the left turn 90 at the end of the guidance swath 86 if no input is received from the operator via the turn signal input assembly. In other embodiments, the controller may output a signal to the movement control system indicative of instructions to stop the work vehicle 10 at the end of the guidance swath unless a turn signal indication from the turn signal input assembly is received. For example, in the illustrated embodiment, a left turn is planned at the end of the guidance swath 86. Accordingly, the controller may instruct the movement control system to initiate the left turn 90 if a left turn indication is received from the turn signal input assembly. Otherwise, the controller may instruct the movement control system to stop the work vehicle at the end of the guidance swath.

If the controller receives a signal indicative of a turn indication in the opposite direction of the planned turn before the work vehicle 10 reaches the end of the guidance swath 86, the controller may adjust the plan accordingly. For example, in the illustrated embodiment, if an obstruction (e.g., vehicle, tree, etc.) is positioned within the planned left turn 90, the operator may control the input device to indicate a right turn (e.g., rotate the turn signal stalk to the right). In response to receiving a signal indicative of the right turn indication, the controller may adjust the plan to include a right turn at the end of the guidance swath 86. The controller may then instruct the movement control system to direct the work vehicle along a path associated with a right turn at the end of the guidance swath. In addition, the controller may adjust the plan (e.g., the order of the guidance swaths, the direction of the turns, etc.) such that the originally planned task (e.g., tilling a portion of the field) may be completed.

While the planned turn 90 is configured to direct the work vehicle 10 from the current guidance swath 86 to an adjacent guidance swath in the illustrated embodiment, in other embodiments, the planned turn may be configured to direct the work vehicle from the current guidance swath to any other suitable guidance swath within the plan (e.g., the n+2 guidance swath, the n+3 guidance swath, or the n+4 guidance swath, where n is the current guidance swath, and the sequence increases from left to right throughout the field). In certain embodiments, the plan may be configured to direct the work vehicle through a regular pattern of guidance swaths (e.g., every guidance swath, every other guidance swath, every third guidance swath, etc.) or an irregular pattern of guidance swaths. For example, the plan may be configured to direct the work vehicle along every other guidance swath (e.g., odd numbered guidance swaths), and then to direct the work vehicle along the intervening guidance swaths (e.g., even numbered guidance swaths). The order of the guidance swaths and/or the guidance swath pattern may be selected by the operator (e.g., via the user interface). Regardless of the order of the guidance swaths, the plan includes planned turns configured to direct the work vehicle from one guidance swath to the subsequent guidance swath.

Figure 5:
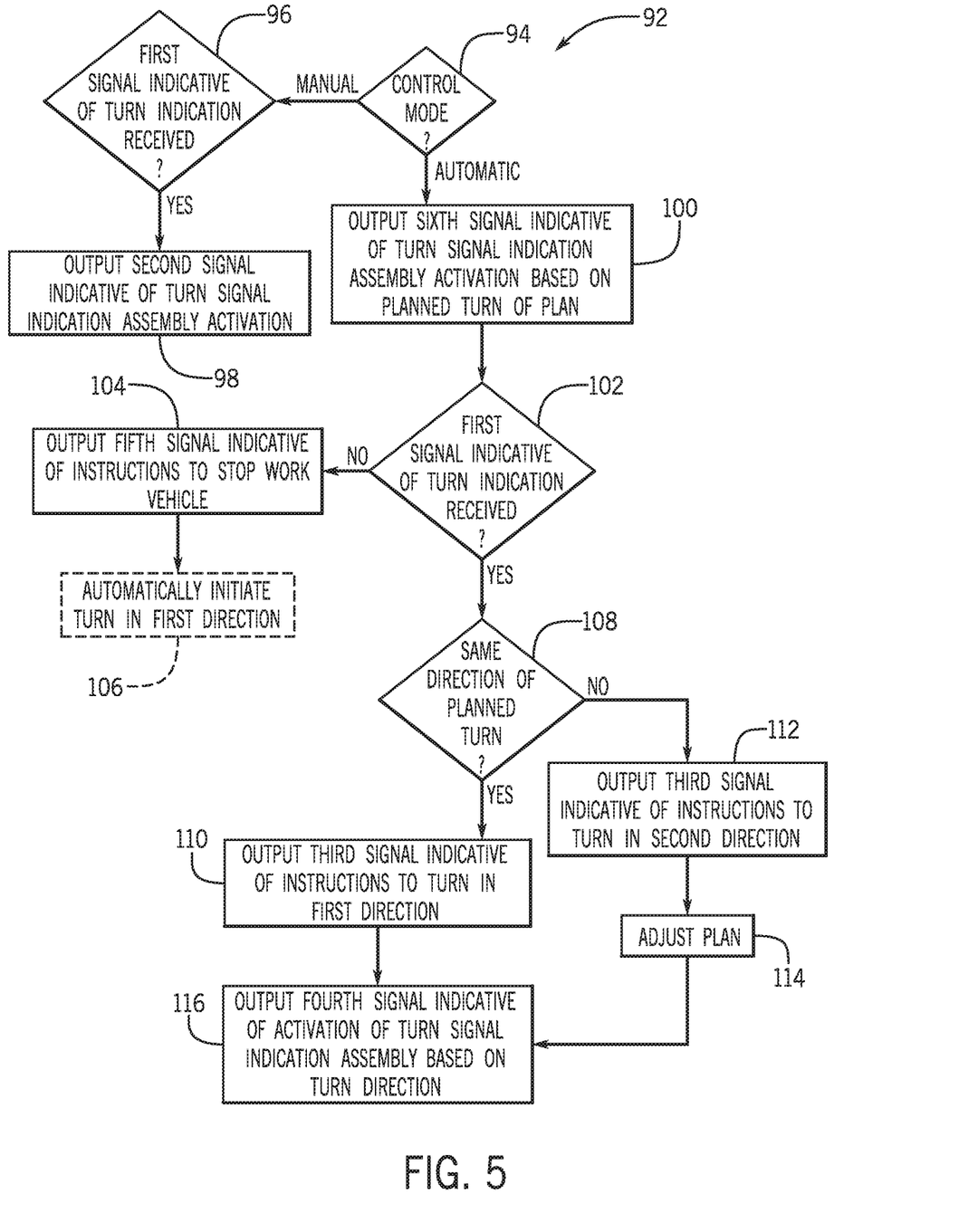
FIG. 5 is a flow diagram of an embodiment of a method for controlling a turn of a work vehicle.

FIG. 5 is a flow diagram of an embodiment of a method 92 for controlling a turn of a work vehicle. First, as represented by block 94, a determination is made regarding whether the controller/control system (e.g., turn control system)/work vehicle is operating in the manual control mode or the automatic control mode. If the controller/control system/work vehicle is operating in the manual control mode, a determination is made regarding whether a first signal indicative of a turn indication is received from the turn signal input assembly, as represented by block 96. If the first signal is received, a second signal indicative of activation of the turn signal indication assembly is output, as represented by block 98. For example, if the first signal is indicative of a left turn indication, the second signal may be indicative of activation of a left turn signal/turn indicator of the turn signal indication assembly. Furthermore, if the first signal is indicative of a right turn indication, the second signal may be indicative of activation of a right turn signal/turn indicator of the turn signal indication assembly.

If the controller/control system/work vehicle is operating in the automatic control mode, a sixth signal indicative of selective activation of a left turn signal and a right turn signal of the turn signal indication assembly is output based on a planned turn of a plan, as represented by block 100. For example, if a left turn is planned, the sixth signal indicative of activation of the left turn signal may be output, and if a right turn is planned, the sixth signal indicative of activation of the right turn signal may be output. Next, as represented by block 102, a determination is made regarding whether the first signal indicative of a turn indication is received from the turn signal input assembly. In certain embodiments, if the first signal is not received before the work vehicle reaches the end of the guidance swath, a fifth signal indicative of instructions to stop the work vehicle is output to the movement control system, as represented by block 104. In further embodiments, if the first signal is not received before the work vehicle reaches the end of the guidance swath, a turn in a first direction is automatically initiated at the end of the guidance swath.

If the first signal indicative of the turn indication is received before the work vehicle reaches the end of the guidance swath, a determination is made regarding whether the direction of the turn indication corresponds to the direction of the planned turn, as represented by block 108. For example, if a left turn is planned, a left turn indication corresponds to the direction of the planned turn. As represented by block 110, if the direction of the turn indication corresponds to the direction of the planned turn, a third signal indicative of instructions to turn the work vehicle in the first direction at the end of the guidance swath is output. For example, if a left turn is planned and the first signal is indication of a left turn indication, a third signal indicative of instructions to turn the work vehicle in a left direction is output.

If the direction of the turn indication does not correspond to the direction of the planned turn, a third signal indicative of instructions to turn the work vehicle in a second direction, opposite the first direction, at the end of the guidance swath is output (e.g., the third signal may be output based on an adjusted plan that includes the turn in the opposite direction of the originally planned turn), as represented by block 112. For example, if a left turn is planned and the first signal is indicative of a right turn indication, a third signal indicative of instructions to turn the work vehicle to the right is output. In certain embodiments, as represented by block 114, the plan is adjusted in response to receiving the first signal indicative of the turn indication in the opposite direction of the planned turn, thereby enabling the work vehicle to complete an originally planned task. Whether the turn indication corresponds to the direction of the planned turn or not, a fourth signal may be output indicative of activation of the turn signal indication assembly based on the turn indication, as represented by block 116. For example, before a left turn is initiated, the fourth signal may be output to cause the left turn signal(s) and/or the left turn indicator of the turn signal indication assembly to illuminate in a flashing pattern. In addition, the fourth signal may be terminated in response to completion of the turn. The method described above may be stored on one or more tangible, non-transitory, machine-readable media and/or may be performed by the processor of the controller described above with reference to FIG. 3.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A turn control system for a work vehicle, comprising:
a turn signal input assembly configured to output a first signal indicative of a turn indication that is one of a left turn indication and a right turn indication, wherein the turn signal input assembly comprises a turn signal input device configured to be arranged in a first position indicative of the left turn indication and in a second position indicative of the right turn indication, and wherein the first signal is generated based on a position of the turn signal input device; and
a controller comprising a memory and a processor, wherein the controller is configured to operate in each of a manual control mode and in an automatic control mode, and further configured to:
receive the first signal from the turn signal input assembly;
wherein, in the manual control mode, the controller is configured to:
output a second signal indicative of activation of a turn signal indication assembly based on the turn indication; and
wherein, in the automatic control mode, the controller is configured to:
identify a turn direction indicated by a planned turn at an end of a guidance swath on which the work vehicle is traveling;
determine if the turn signal input device is arranged in a position indicating a turn direction that is opposite of the turn direction indicated by the planned turn;
responsive to a determination that the turn signal input device is arranged in a position indicating a turn direction that is opposite of the turn direction indicated by the planned turn, output as a third signal to a movement control system indicative of instructions to control a turn direction of the work vehicle based on the turn indication indicated by the position of the turn signal input device; and
responsive to a determination that the turn signal input device is arranged in a position indicating a turn direction that matches the turn direction indicated by the planned turn, output as the third signal to the movement control system indicative of instructions to control the turn direction of the work vehicle at an end of a guidance swath based on the turn indication indicated by the planned turn.

2. The turn control system of claim 1, wherein the controller, while in the automatic control mode, is configured to output a fourth signal indicative of activation of the turn signal indication assembly based on the turn direction.

3. The turn control system of claim 2, wherein the controller is configured to output the fourth signal before initiation of a turn at the end of the guidance swath, and to terminate the fourth signal in response to completion of the turn.

4. The turn control system of claim 1, wherein the controller, while in the automatic control mode, is configured to automatically initiate the turn in a first the direction indicated by the planned turn at the end of the guidance swath unless the turn signal input is arranged in a position indicating a turn indication opposite to the direction indicated by the planned turn.

5. The turn control system of claim 1, wherein the controller, while in the automatic control mode, is configured to output a sixth signal indicative of selective activation of a left turn signal and a right turn signal of the turn signal indication assembly based on a planned turn of a plan, wherein the plan includes the guidance swath.

6. The turn control system of claim 1, wherein the controller, while in the automatic control mode, is configured to adjust a plan in response to responsive to the determination that the turn signal input device is arranged in a position indicating a turn direction that is opposite of the turn direction indicated by the planned turn.

7. A turn control system for a work vehicle, comprising:
a turn signal input assembly comprising an input device, wherein the turn signal input assembly is configured to output a first signal indicative of a turn indication based on a state of the input device;
a controller comprising a memory and a processor, wherein the controller is communicatively coupled to the turn signal input assembly, and the controller is configured to:
identify a turn direction indicated by a planned turn at an end of a guidance swath on which the work vehicle is traveling;
determine if the state of the turn signal input device indicates a turn direction that is opposite of the turn direction indicated by the planned turn;
responsive to a determination that the state of the turn signal input device indicates a turn direction that is opposite of the turn direction indicated by the planned turn, output as a third signal to a movement control system indicative of instructions to control a turn direction of the work vehicle based on the turn direction indicated by the state of the turn signal input device; and
responsive to a determination that the state of the turn signal input device indicates a turn direction that matches the turn direction indicated by the planned turn, output as the third signal to the movement control system indicative of instructions to control a turn direction of the work vehicle at an end of a guidance swath based on the turn direction indicated by the planned turn.

8. The turn control system of claim 7, wherein the input device comprises a turn signal stalk extending from a steering column of the work vehicle.

9. The turn control system of claim 7, comprising the turn signal indication assembly communicatively coupled to the controller, wherein the turn signal indication assembly comprises a left turn signal and a right turn signal.

10. The turn control system of claim 7, wherein the controller, is configured to output a fourth signal indicative of activation of the turn signal indication assembly based on the turn direction.

11. The turn control system of claim 10, wherein the controller is configured to output the fourth signal before initiation of a turn at the end of the guidance swath, and the controller is configured to terminate the fourth signal in response to completion of the turn.

12. The turn control system of claim 7, wherein the controller, is configured to automatically initiate a turn in a first direction at the end of the guidance swath unless the first signal indicative of the turn indication in a second direction, opposite the first direction, is received.

13. The turn control system of claim 7, wherein the controller, is configured to output a fifth signal to the movement control system indicative of instructions to stop the work vehicle unless the first signal indicative of the turn indication is received.

14. The turn control system of claim 7, wherein the controller, is configured to output a sixth signal indicative of selective activation of a left turn signal and a right turn signal of the turn signal indication assembly based on a planned turn of a plan, wherein the plan includes the guidance swath.

15. The turn control system of claim 7, wherein the controller, is configured to adjust a plan in response to receiving the first signal indicative of the turn indication in an opposite direction of a planned turn of the plan, wherein the plan includes the guidance swath.

* * * * *